United States Patent
Shingyoji

(10) Patent No.: US 9,304,207 B2
(45) Date of Patent: Apr. 5, 2016

(54) GPS RECEIVING APPARATUS, A METHOD OF CONTROLLING GPS RECEIVING UNIT, AND A CONTROLLING PROGRAM

(71) Applicant: CASIO COMPUTER CO., LTD., Shibuya-ku, Tokyo (JP)

(72) Inventor: Ryuji Shingyoji, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 46 days.

(21) Appl. No.: 14/067,678

(22) Filed: Oct. 30, 2013

(65) Prior Publication Data

US 2014/0163871 A1 Jun. 12, 2014

(30) Foreign Application Priority Data

Dec. 6, 2012 (JP) ................................. 2012-267222

(51) Int. Cl.
| | |
|---|---|
| *G01C 21/00* | (2006.01) |
| *G01S 19/19* | (2010.01) |
| *G01C 21/16* | (2006.01) |
| *G01C 22/00* | (2006.01) |
| *G07C 1/22* | (2006.01) |

(52) U.S. Cl.
CPC .............. *G01S 19/19* (2013.01); *G01C 21/165* (2013.01); *G01C 22/006* (2013.01); *G07C 1/22* (2013.01)

(58) Field of Classification Search
None
See application file for complete search history.

(56) References Cited

U.S. PATENT DOCUMENTS

| | | | | |
|---|---|---|---|---|
| 8,332,140 | B2* | 12/2012 | de Silva et al. | ............... 701/412 |
| 8,868,102 | B1* | 10/2014 | Crossno et al. | ............ 455/456.1 |
| 2011/0140956 | A1* | 6/2011 | Henry et al. | ............... 342/357.3 |
| 2012/0264447 | A1* | 10/2012 | Rieger, III | ................... 455/456.1 |
| 2013/0122935 | A1* | 5/2013 | Das et al. | .................... 455/456.3 |
| 2014/0278044 | A1* | 9/2014 | Jacobs et al. | ................... 701/300 |

(Continued)

FOREIGN PATENT DOCUMENTS

| | | |
|---|---|---|
| CN | 101685149 A | 3/2010 |
| CN | 101907467 A | 12/2010 |

(Continued)

OTHER PUBLICATIONS

Chinese Office Action (and English translation thereof) dated Oct. 16, 2015, issued in counterpart Chinese Application No. 201310669435.0.

(Continued)

*Primary Examiner* — John R Olszewski
*Assistant Examiner* — James M McPherson
(74) *Attorney, Agent, or Firm* — Holtz, Holtz & Volek PC

(57) ABSTRACT

A GPS receiving apparatus includes a GPS receiving unit which detects a position, a course data storing unit which stores course data representing a course, along which plural transit positions are set, a motion sensor which detects motion of a user, a moving-distance obtaining unit which obtains a moving distance of the user based on the detected user's motion, a proximity judging unit which judges based on the obtained moving distance whether the user has come close to a next transit position along the course, a GPS start-up controlling unit which makes the GPS receiving unit start up, when the proximity judging unit determines that the user has come close to the next transit position, and a GPS stop controlling unit, which brings the GPS receiving unit down, when it is determined that the user has passed through the next transit position.

12 Claims, 4 Drawing Sheets

(56) References Cited

U.S. PATENT DOCUMENTS

2014/0278064 A1* 9/2014 Lee et al. .................. 701/428
2014/0288821 A1* 9/2014 Modica et al. ............. 701/465

FOREIGN PATENT DOCUMENTS

| JP | 09304096 A | 11/1997 |
|----|------------|---------|
| JP | 10-038993 A | 2/1998 |
| JP | 11-295410 A | 10/1999 |
| JP | 2001165670 A | 6/2001 |
| JP | 2008122092 A | 5/2008 |
| JP | 2009092506 A | 4/2009 |
| JP | 2009294000 A | 12/2009 |
| JP | 2011191135 A | 9/2011 |

OTHER PUBLICATIONS

Japanese Office Action (and English translation thereof) dated Jan. 5, 2016, issued in counterpart Japanese Application No. 2012-267222.

* cited by examiner

GPS RECEIVING APPARATUS, A METHOD OF CONTROLLING GPS RECEIVING UNIT, AND A CONTROLLING PROGRAM

CROSS-REFERENCE TO RELATED APPLICATION

The present application is based upon and claims the benefit of priority from the prior Japanese Patent Application No. 2012-267222, filed Dec. 6, 2012, the entire contents of which are incorporated herein by reference.

BACKGROUND OF THE INVENTION

1. Field of the Invention

The present invention relates to GPS receiving apparatus, a method of controlling GPS receiving unit, and a controlling program, for giving notice of a current position a predetermined course to a user who jogs or runs along the predetermined course.

2. Description of the Related Art

In recent, those who incorporate jogging into their daily routine or participate actively in marathons and enjoy running are increasing. Meanwhile, small-size electronic devices are widely known among those runners, which devices are used to record the running course and marked time.

Some small-size electronic devices are provided with GPS (Global Positioning System) receiver, which can detect a current position with a comparatively high degree of accuracy.

But general-used GPS receivers consume much energy, and therefore it is not appropriate to incorporate such GPS receiver in small-size devices of a wristwatch type for the runners, which are required to work with less power consumption.

From the standpoint of less power consumption in GPS apparatuses, an intermittent data-receiving method of receiving positioning data intermittently is proposed, for example, in Japanese Unexamined Patent Publication No. Hei 11-295410. This data-receiving method uses a quiescent-period setting table, which sets previously quiescent periods in receiving operation of an apparatus in accordance with a moving rate and moving distance of a moving body, reducing power consumption by the apparatus and calculating an exact track of the moving body.

Further, a positioning apparatus is disclosed in Japanese Unexamined Patent Publication No. Hei 10-038993, which apparatus receives positioning data intermittently to detect the current position of a moving body. The faster the moving body moves, the shorter cycles the positioning apparatus receives the positioning data, whereby the current position of the moving body can be detected always at the most suitable distance interval.

Various conventional techniques have been proposed, for enhancing power-saving by receiving positioning data of the moving body intermittently depending on the moving rate and/or moving distance of the moving body. ALL of the conventional techniques are used to calculate a precise position of the moving body from the positioning data, but are not appropriate for the devices of a wristwatch type to be used by runners, because the devices of a wristwatch type are required to calculate passing positions along a predetermined running course with a high degree of accuracy, using less driving power.

The present invention has been made to solve disadvantages involve in the conventional techniques and provides GPS receiving apparatus, a method of controlling GPS receiving unit, and a controlling program, for detecting passing positions with a high degree of accuracy and enhancing energy-conservation.

SUMMARY OF THE INVENTION

According to one aspect of the invention, there is provided GPS receiving apparatus, which comprises GPS receiving unit, which detects a position, a course data storing unit, which stores course data representing a course, along which a start position and plural transit positions are set, a motion sensor, which detects motion of a user, a moving-distance obtaining unit, which obtains a moving distance of the user based on the user's motion detected by the motion sensor, a proximity judging unit, which judges based on the moving distance obtained by the moving-distance obtaining unit, whether the user has come close to a next transit position along the course represented by the course data stored in the course data storing unit, GPS start-up controlling unit, which makes GPS receiving unit start up, when the proximity judging unit determines that the user has come close to the next transit position along the course, and GPS stop controlling unit, which brings GPS receiving unit down, when it is determined based on the position detected by GPS receiving unit, that the user has passed through the next transit position along the course.

As described, the present invention provides the apparatus, which can detect the passing positions with a high degree of accuracy and enhance energy-conservation.

DETAILED DESCRIPTION OF THE PREFERRED EMBODIMENTS

The embodiments of the present invention will be described with reference to the accompanying drawings in detail.

Figure 1:
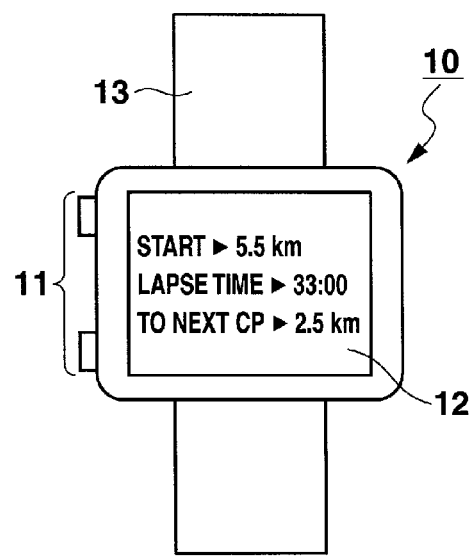
FIG. 1 is a front view showing an external configuration of an electronic device of a wristwatch type according to an embodiment of GPS receiving apparatus of the present invention.

FIG. 1 is a front view showing an external configuration of an electronic device of a wristwatch type according to an embodiment of GPS receiving apparatus of the present invention.

This GPS receiving apparatus can be realized by handheld digital devices such as mobile phones, game machines, mobile PC and the like, in addition to by the electronic device 10 of a wristwatch type, which will be described hereinafter.

The electronic device 10 of a wristwatch type has a key input unit 11 on a side of the body. The key input unit 11 includes plural buttons for setting various modes, and is used to give an instruction of adjusting a time, and giving a start/stop instruction of operation. Further, the electronic device 10 of a wristwatch type is provided with a displaying unit 12 on the front surface of the body. The displaying unit 12 displays displaying contents in accordance with the set mode. A reference number 13 denotes a wristband.

The electronic device 10 of a wristwatch type has a function appropriate for use of joggers and/or runners. More specifically, when the joggers and/or runners run along a previously determined course, the electronic device 10 of a wristwatch type has functions, which are conveniently used by the joggers and/or runners, such as a function of displaying a position or a location along the course where the jogger is now running, a function of indicating how far the jogger has gotten over from the start position of the course, a function of displaying or indicating a distance left to reach the goal position or a following or next check position of the course, a function of displaying or indicating a lap time, and a function of displaying or indicating a lapse time per unit distance.

Figure 2:
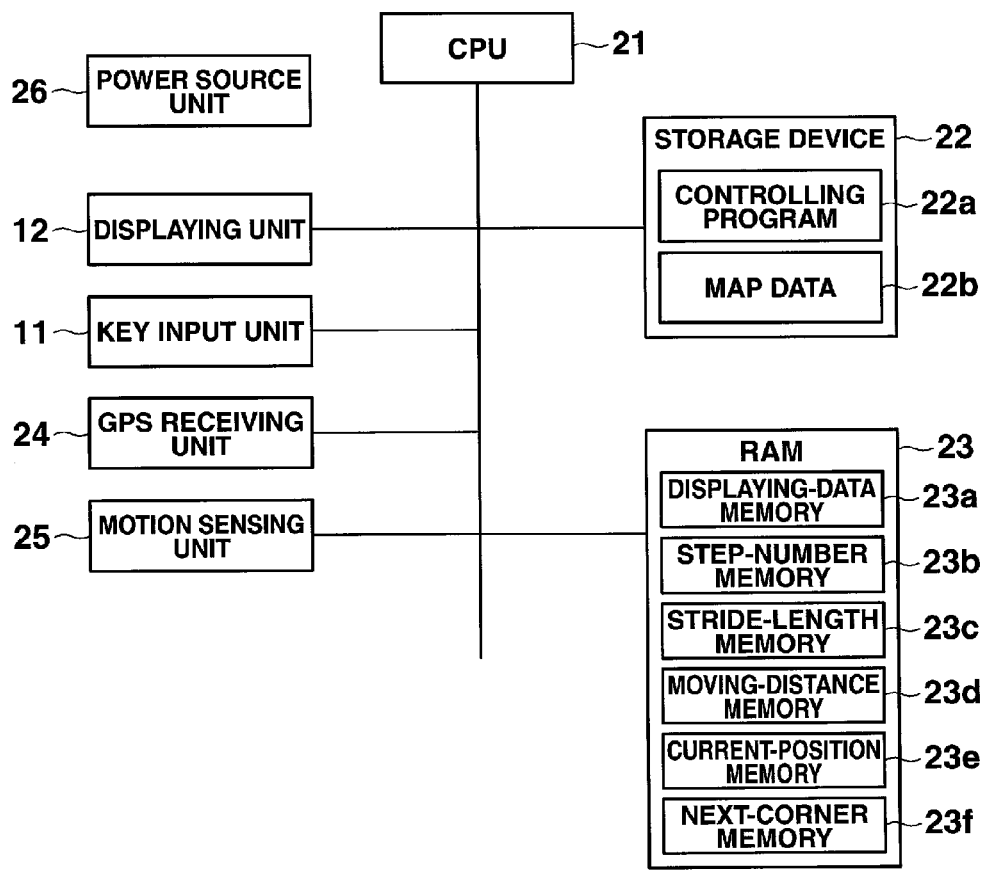
FIG. 2 is a block diagram of a configuration of an electronic circuit of the electronic device of a wristwatch type.

FIG. 2 is a block diagram of a configuration of an electronic circuit of the electronic device 10 of a wristwatch type. As shown in FIG. 2, the electronic device 10 of a wristwatch type is provided with a computer, that is, CPU (controlling unit) 21.

CPU 21 uses RAM 23 as a working memory and runs a controlling program 22a to control the whole operation of the electronic circuit of the electronic device 10. The controlling program 22a is previously stored in a storage device 22 or is transferred from an external device (not shown) and stored in the storage device 22. The controlling program 22a is activated in response to a user's operation signal entered from the input unit 11, positioning data of the current position generated based on data received by GPS receiving unit 24, and/or various sensor signals responding to user's motions sensed by a motion sensing unit 25.

GPS receiving unit 24 receives signals from plural GPS satellites to calculate a latitude and longitude of the current position, outputting the positioning data.

The motion sensing unit 25 comprises a tri-axial acceleration sensor, a tri-axial geomagnetic sensor and a tri-axial gyro sensor (not shown). The motion sensing unit 25 calculates or measures and outputs a moving distance, change in direction, a running form of the user and the like based on sensor signals output from these sensors. The sensor signal output from the acceleration sensor is mainly used to count the number of steps of the runner to calculate a running speed and a running distance of the runner. The sensor signals output from the geomagnetic sensor and gyro sensor are mainly used to calculate the running direction of the runner.

Figure 3:
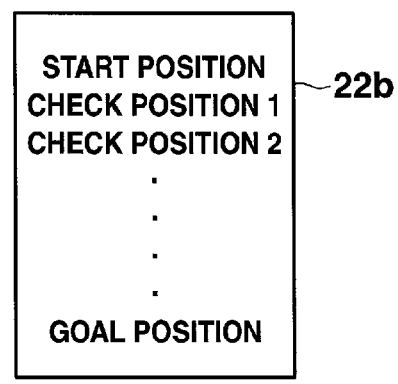
FIG. 3 is a view showing items of map data (course information) stored in a storage device of the electronic device of a wristwatch type.

FIG. 3 is a view showing items contained in map data (course information) 22b stored in the storage device 22 of the electronic device 10 of a wristwatch type.

Figure 4:
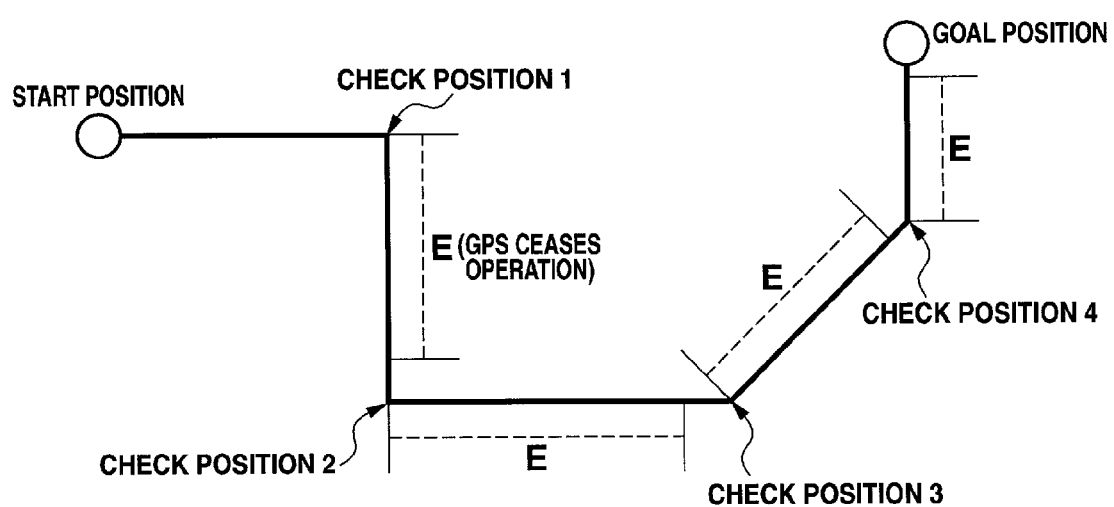
FIG. 4 is a schematic view showing an example of a running course (course information) set in the map data stored in the storage device of the electronic device of a wristwatch type.

FIG. 4 is a schematic view showing an example of the running course (course information) stored in the storage device 22 of the electronic device 10 of a wristwatch type. Before the user starts running, plural pieces of map data (course information) 22b of a running course, for instance, data of a jogging course, and data of a running course in a marathon event are stored in the storage device 22 of the electronic device 10 of a wristwatch type. As shown in FIG. 3, each piece of map data consists of position data including the start position, passing points or check positions on the halfway (corners in the present embodiment) and the goal position. Each piece of position data has data of latitudes and longitudes (latitude/longitude data) and data of distance(s) (distance data) from the start position to the current position. The map data (course information) 22b is created by the user based on a map displayed on a computer, on which a predetermined software is executed, and/or the map data is supplied from the part of the host, and is stored in the storage device 22 through a communication interface (not shown) of the electronic device 10 of a wristwatch type. The distance data is not always made previously as data, but can be calculated based on data of latitudes and longitudes in the process.

RAM 23 comprises a memory (displaying-data memory) 23a for recording displaying data, a memory (step-number memory) 23b for recording the number of steps, a memory (stride-length memory) 23c for recording a length of stride, a memory (moving-distance memory) 23d for recording a moving distance, a memory (current-position memory) 23e for recording a current position, and a memory (next-corner memory) 23f for recording a next corner.

On the displaying-data memory 23a, the displaying data to be displayed on the displaying unit 12 is expanded and stored as image data in a bit map format.

In the step-number memory 23b is stored data of the number of steps counted based on a sensor signal, which is output from the motion sensing unit 25 in response to motion of the user (runner).

In the stride-length memory 23c is stored data of stride-length, which is calculated based on a moving distance between some points (positions) and the number of steps.

In the moving-distance memory 23d is stored a moving distance of the user (runner) running along the course selected from the map data 22b. More precisely, a moving distance calculated from the positioning data received by GPS receiving unit 24 or a moving distance calculated based on the sensor signal output from the motion sensing unit 25 is successively adjusted based on the distance data of the running course, and the successively adjusted moving distance is stored in the memory 23d.

In the current-position memory 23e is stored a moving position along the course selected from the map data 22b, where the user (runner) is now running. More precisely, position data calculated from the positioning data received by GPS receiving unit 24 or position data calculated based on the sensor signal output from the motion sensing unit 25 is successively adjusted in accordance with latitude/longitude data at each position along the running course, and a moving position indicated by the successively adjusted position data is stored in the memory 23e.

In the next-corner memory 23f are recorded (or set) latitude/longitude data and distance data corresponding to the first check position along the running course, when the running course is set to be recorded as map data (course information) 22b. Thereafter, when the user (runner) starts running, CPU 21 confirms if the user (runner) has reached the first check position, based on the positioning data received by GPS receiving unit 24 or the sensor signal output from the motion sensing unit 25 in response to movement of the user (runner). When it is confirmed that the user has reached the first check position, then CPU 21 sets (records) the latitude/longitude data and distance data corresponding to the following (next) check position in the next-corner memory 23f.

A power source unit 26 or a battery applies a driving voltage to the electronic circuit of the electronic device 10.

In the electronic device 10 of a wristwatch type having the above described configuration, CPU 21 controls the whole operation of the electronic circuit in accordance with commands written in the controlling program 22a. The software and hardware cooperate and work together to realize the functions to be described hereinafter.

A system or function for supporting a runner will be described, based on GPS receiving function of the electronic device 10 of a wristwatch type.

First Embodiment

Figure 5:
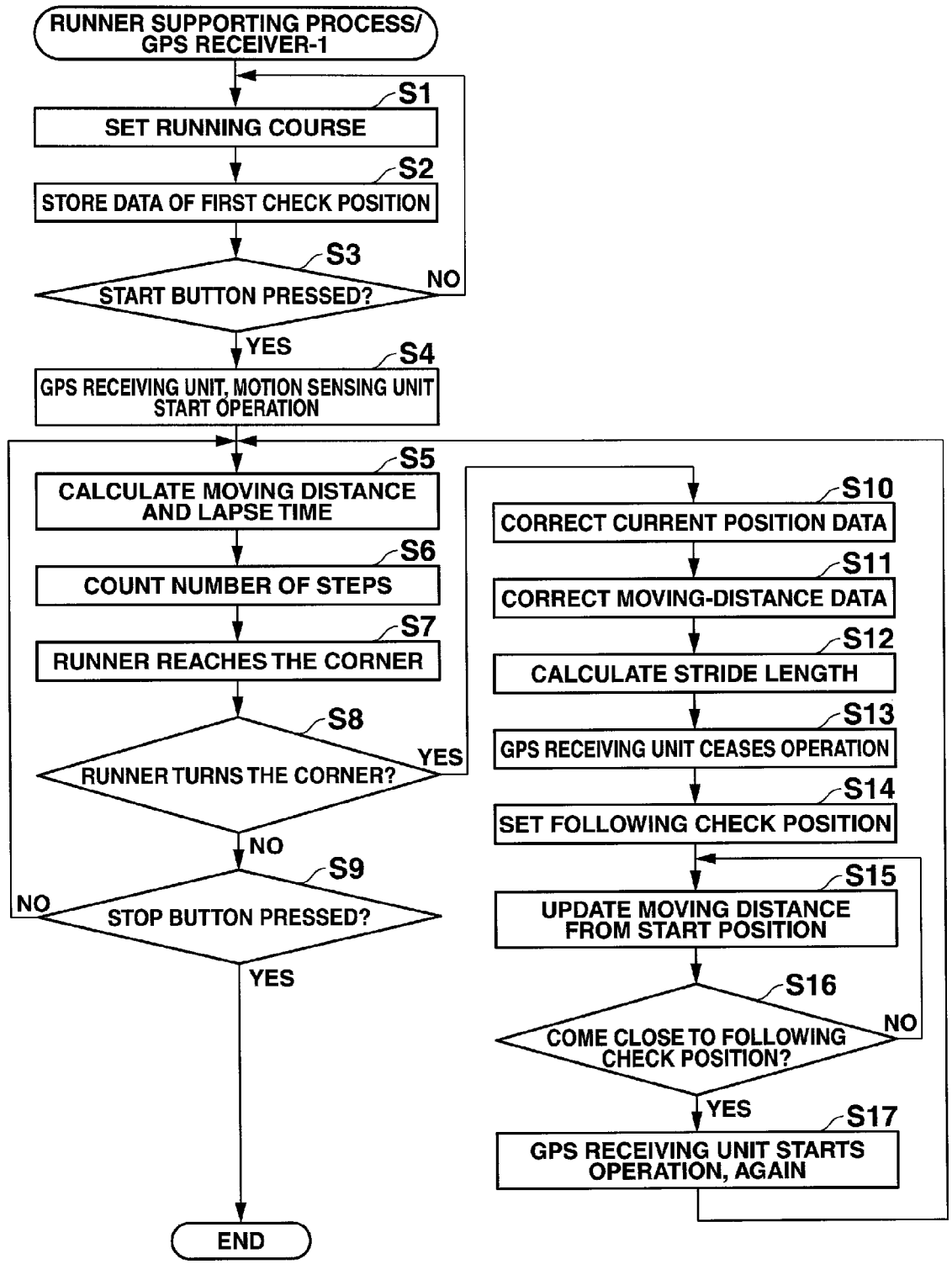
FIG. 5 is a flowchart of a process of supporting a runner according to the first embodiment based on GPS receiving function of the electronic device of a wristwatch type.

FIG. 5 is a flowchart of a process of supporting a runner according to the first embodiment based on GPS receiving function of the electronic device 10 of a wristwatch type.

When a mode of supporting a runner (runner-supporting mode) has been set in accordance with the controlling program 22*a* activated in response to user's operation performed on the input unit 11, the displaying-data memory 23*a*, step-number memory 23*b*, stride-length memory 23*c*, moving-distance memory 23*d*, current-position memory 23*e* and next-corner memory 23*f* are reset. A course setting message is displayed on the displaying unit 12, prompting the user to set his/her running course.

When the user selects his/her desired course from among the courses contained in the map data (course information) stored in the storage device 22, the selected course is set as the running course (step S1). The latitude/longitude data and distance data corresponding to the first check position along the set running course are recorded in the next-corner memory 23*f* (step S2).

When the user (runner) wearing the electronic device 10 has pressed a start button at the start position and started running (YES at step S3), GPS receiving unit 24 and the motion sensing unit 25 starts their operation (step S4).

Then, the moving distance from the start position is calculated based on the positioning data received by GPS receiving unit 24 and recorded in the moving-distance memory 23*d*, and further a lapse time is calculated (step S5).

At this time, the moving distance, the lapse time, and a distance to the next check position (CP) are displayed on the displaying unit 12 (Refer to FIG. 1).

CPU 21 analyzes the runner's (running) motion based on a sensor signal output from the acceleration sensor of the motion sensing unit 25 to count the number of steps taken by the user from the beginning of the running (step S6). The counted number of steps is stored in the step-number memory 23*b*.

CPU 21 judges whether the user has turned the corner, based on the positioning data received by GPS receiving unit 24 and the direction data obtained from the geomagnetic sensor and the gyro sensor of the motion sensing unit 25 (steps S7 and S8).

When the user has not turned the corner (NO at step S8) and does not press a stop button (NO at step S9), a process of calculating the moving distance and a process of calculating the lapse time from the beginning of running and a process of counting the number of steps are repeatedly performed, and the moving distance, lapse time and the distance to the next check position (CP) are successively updated and displayed on the displaying unit 12 (steps S5 and S6).

Thereafter, when, depending on the positioning data received by GPS receiving unit 24 and the direction data obtained by the geomagnetic sensor and the gyro sensor of the motion sensing unit 25, it is determined that the user has turned the corner (the first check position) (YES at step S8), then the current position data (current latitude/longitude data) corresponding to the positioning data of GPS receiving unit 24 stored in the current-position memory 23*e* is corrected to the latitude/longitude data corresponding to the first check position, stored in the next-corner memory 23*f* (step S10).

This is because, since the position obtained by GPS can involve error in the order of a distance from several meters to several ten meters, varying according to data receiving conditions, CPU 21 corrects the current position obtained by GPS to the accurate position by detecting that the user has just passed through the corner. At the same time, moving-distance data stored in the moving-distance memory 23*d* is corrected to distance data corresponding to the first check position stored in the next-corner memory 23*f* (step S11). This is because, since the positions obtained by GPS can also involve error and the distances calculated using the signals output from the motion sensing unit 25 can involve error, these pieces of data are corrected by detecting that the runner has just passed through the corner.

A distance from the start position set in the next-corner memory 23*f* to the first check position is divided by the actual number of steps recorded in the step-number memory 23*b*, whereby the user's stride length is obtained. This stride length is recorded in the stride-length memory 23*c* (step S12).

Then, GPS receiving unit 24 ceases its operation (step S13), and the latitude/longitude data and distance data corresponding to the following check position are recorded in the next-corner memory 23*f* (step S14).

At this time, the distance corresponding to the first check position is subtracted from the distance corresponding to the second check position to obtain a distance from the second check position to the following check position (CP), and the obtained distance is displayed on the displaying unit 12.

Thereafter, every time the runner's one step motion has been detected based on a sensor signal output from the acceleration sensor of the motion sensing unit 25, the stride length recorded in the stride-length memory 23*c* is added to the moving distance recorded in the moving-distance memory 23*d* to update the moving distance form the start position (step S15).

Then, CPU 21 judges whether the runner has come close to the following check position (step S16). This judgment is made by comparing the distance data indicating a distance from the current position to the following check position, recorded in the next-corner memory 23*f* with the moving distance recorded in the moving-distance memory 23*d*, and judging if the difference between them has become less than a predetermined distance (for instance, 100 meters).

When it is determined that the runner has not come close to the following check position (NO at step S16), CPU 21 returns to step S15. When it is determined that the runner has come close to the following check position (YES at step S16), GPS receiving unit 24 starts its operation, again (step S17), and the processes at step S5 to step S17 are performed, again.

As described above, GPS receiving unit 24 ceases its operation during the period from step S13 to step S17, saving energy.

The calculation of a moving distance, the updating process of the moving distance and the updating process of the lapse time based on the positioning data sent from GPS receiving unit 24 and the process of counting the number of steps based on the sensor signal from the motion sensing unit 25 are repeatedly performed until it is determined that the runner has turned the following check position (corner) (steps S5 to S9→step S5).

When it is determined that the runner has turned the corner (second check position) (YES at step S8), based on the data from GPS receiving unit 24 or from the motion sensing unit 25, the current position data (latitude/longitude) corresponding to the positioning data of GPS receiving unit 24, recorded in the current-position memory 23*e* is corrected to the latitude/longitude data corresponding to the second check position, set in the next-corner memory 23f (step S10).

At the same time, the data of moving distance stored in the moving-distance memory 23d is corrected to the distance data corresponding to the second check position set in the next-corner memory 23f (step S11).

A distance from the first check position to the second check position is divided by the number of steps taken in the distance, stored in the step-number memory 23b, whereby the user's stride length on the course is obtained. This stride length is recorded in the stride-length memory 23c (step S12).

Then, GPS receiving unit 24 ceases its operation, saving energy (step S13), and the latitude/longitude data and distance data corresponding to the following check position (third check position) are recorded in the next-corner memory 23f (step S14). And the moving distance of the user form the start position is updated based on the signal from the motion sensing unit 25 as in the same manner described above. (step S15).

When it is determined that the user has come close to the following check position (YES at step S16), GPS receiving unit 24 starts its operation, again (step S17) and the process returns to step S5.

As described above, GPS receiving unit 24 ceases its operation while the user is running along the course from the current check position to the near side of the following check position, enhancing energy-saving. Meanwhile, it is precisely detected, whether the user has turned the corner, depending on not only the data from the motion sensing unit but also the data from GPS receiving unit.

As shown in FIG. 4, every time the user has passed through the check positions 1, 2, . . . , the moving distances of the user from the start position along the running course are corrected to the previously defined distances from the start position to the respective check positions. Therefore, even though the moving distances obtained based on the data of GPS receiving unit 24 and the motion sensing unit 25 involve error, accurate moving distances can be obtained and displayed.

Meanwhile, since GPS receiving unit 24 halts its operation during a period "E" (Refer to FIG. 4), in which the user is running the course from one check position to the near side of the following check position, energy conservation is enhanced to a large extent, the power source 26 using a lower-capacity battery allows the electronic device 10 to work continuously for a long time.

Second Embodiment

Also, in the second embodiment of the invention, plural check positions are set along the running course and stored in the storage device 22 as the map data (course information) 22b, but these check positions are set at constant intervals (for instance, every 1 Km).

Figure 6:
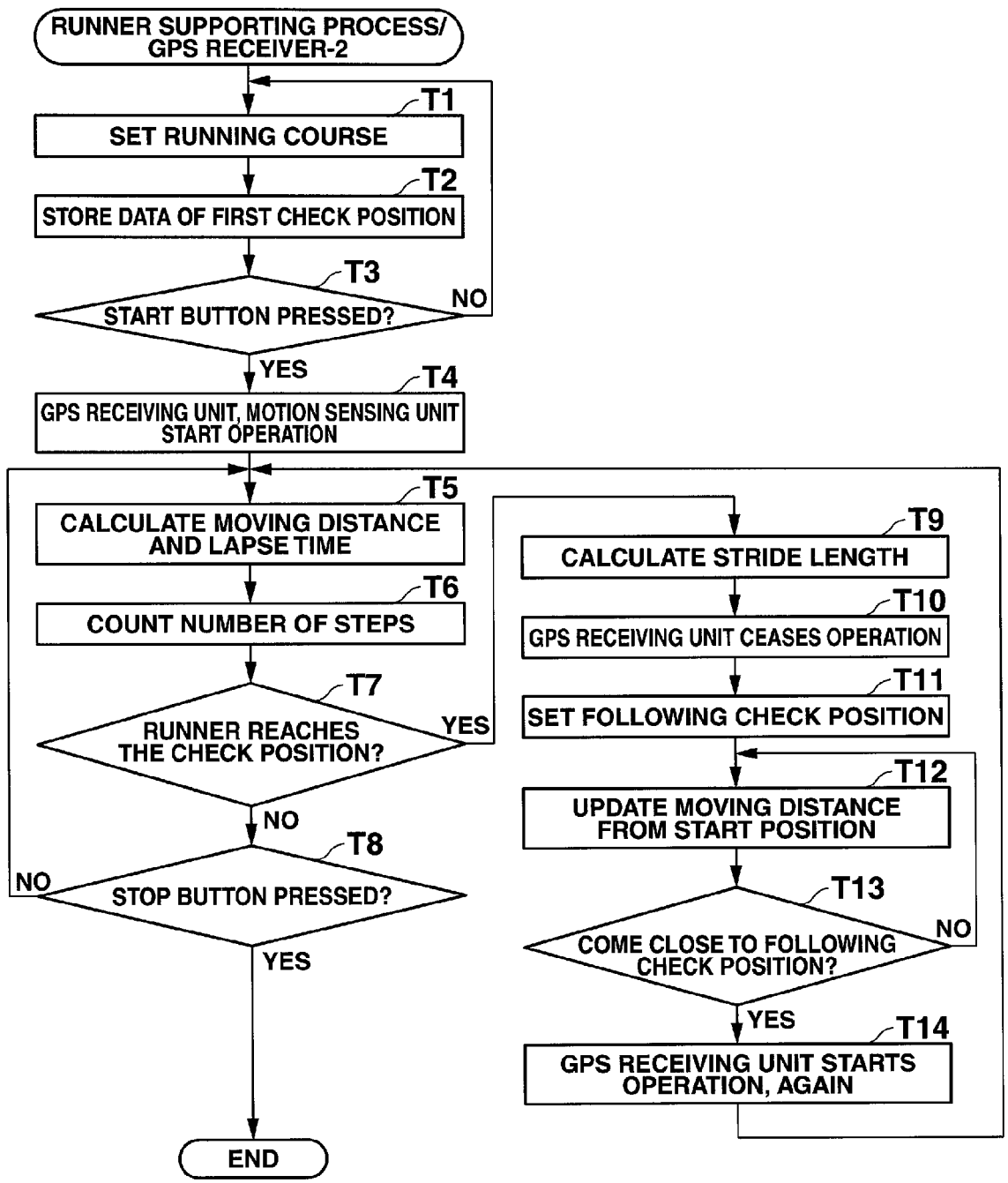
FIG. 6 is a flow chart of a process of supporting the runner according to the second embodiment based on GPS receiving function of the electronic device of a wristwatch type.

FIG. 6 is a flow chart of a process of supporting the runner according to the second embodiment based on GPS receiving function of the electronic device 10 of a wristwatch type.

On the displaying unit 12, a course-setting message is displayed in response to the user's operation on the key input unit 11. When a user's desired running course is selected from among the map data (course information) 22b stored in the storage unit 22 in accordance with the displayed course-setting message (step T1 in FIG. 6), the latitude/longitude data and distance data (1 Km data) corresponding to the first check position set along the selected running course are set and stored in a next check-position memory area (not shown) in RAM 23 (step T2).

When the user wearing the electronic device 10 presses the start button at the start position and starts running (YES at step T3), GPS receiving unit 24 and the motion sensing unit 25 start their operation (step T4).

Then, a moving distance of the user from the start position is calculated based on the positioning data received by GPS receiving unit 24. The calculated distance is stored in the moving-distance memory 23d. Also, a lapse time from the starting time is calculated (step T5).

At this time, the moving distance stored in the moving-distance memory 23d, the calculated lapse time, and a distance to the following check position (CP) are displayed on the displaying unit 12 (Refer to FIG. 1). The distance to the following check position (CP) is obtained by subtracting the moving distance from the distance data (1 Km data) corresponding to the first check position stored in the next check-position memory area in RAM 23.

Further, the runner's running motion is detected based on the sensor signal output from the acceleration sensor of the motion sensing unit 25 to count the number of steps from the start of the running, and the counted number of steps is stored in the step-number memory 23b (step T6).

The moving distance stored in the moving-distance memory 23d is compared with the distance data (1 Km data) corresponding to the first check position stored in the next check-position memory area to judge whether the user has reach the first check position (step T7).

When the user has not reached the first check position (NO at step T7), and when the stop button is not pressed (NO at step T8), the process of calculating the moving distance and the process of calculating the lapse time from the start of running and the process of counting the number of steps are repeatedly performed, and the moving distance, lapse time and a distance to the next check position (CP) are successively updated and displayed on the displaying unit 12 (steps T5 and T6).

When it is determined that the user has reached the first check position (YES at step T7), the moving distance (1 Km) is divided by the actual number of steps recorded in the step-number memory 23b, whereby the user's stride length is obtained. This stride length is recorded in the stride-length memory 23c (step T9).

Then, GPS receiving unit 24 ceases the operation (step T10), and the latitude/longitude data and distance data (2 Km) corresponding to the following check position (second check position) are recorded in the next check-position memory area (step T11).

Thereafter, every time the runner's one step motion has been detected based on the sensor signal output from the acceleration sensor of the motion sensing unit 25, the stride length recorded in the stride-length memory 23c is repeatedly added to the moving distance recorded in the moving-distance memory 23d to update the moving distance form the start position (step T12).

When it is determined that the user has come close to the near side (for instance, 100 m) of the second check position (YES at step T13), GPS receiving unit 24 starts the operation, again (step T14) and the process returns to step T5.

The calculation of a moving distance, the updating process of the moving distance and the updating process of the lapse time based on the positioning data sent from GPS receiving unit 24 and the process of counting the number of steps based on the sensor signal from the motion sensing unit 25 are repeatedly performed until it is determined that the user has reached the second check position (steps T5 to T9 to step T5).

When it is determined that the user has reached the second check position (YES at step T7), the stride length of the user is calculated (step T9) and GPS receiving unit 24 ceases the operation, again (step T10), and then the following check position is set in the next check-position memory area (step T11). Thereafter, the similar processes are repeatedly performed until the user reaches the goal position and presses the stop button.

As described above, GPS receiving unit 24 halts the operation while the user is running along the courses defined between two adjacent check positions, and GPS receiving unit 24 works only for predetermined periods for calculation of moving distances based on its positioning data. Therefore, the energy conservation is enhanced to a large extent, and the moving distances along the selected running course can be precisely calculated and displayed.

In each embodiment of the invention, the electronic device 10 of a wristwatch type has been described, which calculates and displays on the displaying unit various data such as the moving distances from the start position, lapse times, distances to the next check position, a lapse time per unit distance, and the like. But it is possible to modify the electronic device 10, such that the electronic device 10 will calculate average speeds respectively along the distances between the adjacent check positions and expected transit times based on the various data, and will display the calculated data.

The methods and databases including the map data (course information) 22b, used in the processes performed in the electronic device 10 according to the embodiments of the invention, that is, the method and databases used in the process of supporting a runner (user) based on the function of GPS receiving unit and performed in accordance with the flow chart of FIG. 5 in the first embodiment of the invention, and also the method and databases used in the process of supporting a runner (user) based on the function of GPS receiving unit and performed in accordance with the flow chart of FIG. 6 in the second embodiment of the invention, can be written into a computer executable program. This computer executable program can be also recorded in external recording media (not shown), such as memory cards (ROM cards, RAM cards), magnetic disks (floppy disks, hard disks), optical disks (CD-ROM, DVD) and semi-conductor memories. These recording media with the methods and databases recorded thereon can be distributed. In the electronic device of a wristwatch type, provided with a computer, the storage device 22, GPS receiving unit 24, and the motion sensing unit 25, the computer reads the program from the external recording medium onto the storage device 22, and runs the program to control the whole operation of the electronic device 10, thereby realizing the function of supporting a runner (user) with a high degree of accuracy and enhanced energy conservation. The computer of the electronic device can perform substantially the same process as the method described in the embodiments of the invention.

The data of the program for realizing the methods can be transferred in a program cord format through a network. The electronic device of a wristwatch type, provided with a computer, the storage device 22, GPS receiving unit 24, and the motion sensing unit 25, receives the program data, and can realize the function of supporting a runner with a high degree of accuracy and enhanced energy conservation, too.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A GPS receiving apparatus, comprising:
a memory which stores (i) course data representing a course, along which a plurality of corners are set as transit positions from a start position to a goal, and (ii) distance data indicating respective distances from the start position to the respective transit positions;
a GPS receiver which detects a position based on GPS signals received from a GPS satellite;
a motion sensor which detects motion and change in movement direction of a user; and
a processor which is configured to:
obtain a moving distance of the user based on the motion of the user detected by the motion sensor;
determine, based on the obtained moving distance and based on a distance to each of the transit positions indicated by the distance data stored in the memory, whether the user has come within a predetermined distance to a next transit position along the course represented by the course data stored in the memory;
determine, based on changes in the position detected by the GPS receiver and the motion and change in movement direction of the user detected by the motion sensor, whether the user has turned and passed through the next transit position along the course;
start operation of the GPS receiver so that the GPS receiver receives GPS signals from the GPS satellite when it is determined that the user has come within the predetermined distance to the next transit position along the course; and
stop operation of the GPS receiver so that the GPS receiver stops receiving GPS signals from the GPS satellite when it is determined that the user has turned and passed through the next transit position along the course, based on changes in the position detected by the GPS receiver and the motion and change in movement direction of the user detected by the motion sensor.

2. The GPS receiving apparatus, according to claim 1, wherein the processor is further configured to correct the position detected by GPS receiver, based on the course data stored in the memory, when it is determined that the user has passed through one of the transit positions.

3. The GPS receiving apparatus, according to claim 2, wherein the processor is further configured to correct the obtained moving distance of the user, based on the distance data stored in the memory.

4. The GPS receiving apparatus, according to claim 1, wherein:
the motion sensor has an acceleration sensor; and
the processor is further configured to count a number of steps of the user from an output from the acceleration sensor, and to calculate a moving distance of the user based on the counted number of steps of the user.

5. A method of controlling a GPS receiver, comprising:
storing, in a memory, course data representing a course, along which a plurality of corners are set as transit positions from a start position to a goal, and (ii) distance data indicating respective distances from the start position to the respective transit positions;
detecting a position with the GPS receiver based on GPS signals received by the GPS receiver from a GPS satellite;
detecting motion and change in movement direction of a user by a motion sensor;
obtaining a moving distance of the user based on the detected motion of the user;

determining based on the obtained moving distance of the user and based on a distance to each of the transit positions indicated by the distance data stored in the memory, whether the user has come close within a predetermined distance to a next transit position along the course represented by the course data stored in the memory;

determining, based on changes in the position detected by the GPS receiver and the motion and change in movement direction of the user detected by the motion sensor, whether the user has turned and passed through the next transit position along the course;

starting operation of the GPS receiver so that the GPS receiver receives GPS signals from the GPS satellite, when it is determined that the user has come within the predetermined distance to the next transit position along the course; and stopping operation of the GPS receiver so that the GPS receiver does not receive GPS signals from the GPS satellite, when it is determined that the user has passed through the next transit position along the course, based on changes in the position detected by the GPS receiver and the motion and change in movement direction of the user detected by the motion sensor.

6. The method according to claim 5, further comprising:
correcting the position detected by GPS receiver, based on the course data stored in the memory, when it is determined that the user has passed through one of the transit positions.

7. The method according to claim 6, further comprising correcting the obtained moving distance of the user, based on the distance data stored in the memory.

8. The method according to claim 5, wherein:
the motion sensor has an acceleration sensor; and
obtaining the moving distance comprises counting a number of steps of the user from an output from the acceleration sensor, and calculating a moving distance of the user based on the counted number of steps of the user.

9. A non-transitory computer-readable storage medium having an executable program stored thereon for controlling a computer of an electronic device, wherein the electronic device comprises a GPS receiver for detecting a position and a motion sensor for detecting motion of a user, the program being executable by the computer to cause the computer to perform functions comprising:
detecting a position with the GPS receiver based on GPS signals received by the GPS receiver from a GPS satellite;
detecting motion and change in movement direction of a user by a motion sensor;
obtaining a moving distance of the user based on the detected motion of the user;
determining based on the obtained moving distance of the user and based on a distance to each of the transit positions indicated by the distance data stored in the memory, whether the user has come within a predetermined distance to a next transit position along the course represented by the course data stored in the memory;
determining, based on changes in the position detected by the GPS receiver and the motion and change in movement direction of the user detected by the motion sensor, whether the user has turned and passed through the next transit position along the course;
starting operation of the GPS receiver so that the GPS receiver receives GPS signals from the GPS satellite, when it is determined that the user has come within the predetermined distance to the next transit position along the course; and
stopping operation of the GPS receiver so that the GPS receiver does not receive GPS signals from the GPS satellite, when it is determined that the user has passed through the next transit position along the course, based on changes in the position detected by the GPS receiver and the motion and change in movement of the user detected by the motion sensor.

10. The non-transitory computer-readable storage medium having the executable program stored thereon according to claim 9, wherein the program further causes the computer to perform a further function comprising:
correcting the position detected by GPS receiver, based on the course data stored in the memory, when it is determined that the user has passed through one of the transit positions.

11. The non-transitory computer-readable storage medium having the executable program stored thereon according to claim 10,
further comprising correcting the obtained moving distance of the user, based on the distance data stored in the memory.

12. The non-transitory computer-readable storage medium having the executable program stored thereon according to claim 9, wherein:
the motion sensor has an acceleration sensor; and
obtaining the moving distance comprises counting a number of steps of the user from an output from the acceleration sensor, and calculating the moving distance of the user based on the counted number of steps of the user.

* * * * *

UNITED STATES PATENT AND TRADEMARK OFFICE
CERTIFICATE OF CORRECTION

PATENT NO. : 9,304,207 B2
APPLICATION NO. : 14/067678
DATED : April 5, 2016
INVENTOR(S) : Ryuji Shingyoji It is certified that error appears in the above-identified patent and that said Letters Patent is hereby corrected as shown below:

In the claims,

Column 11, line 4, after "come" delete "close".

Column 12, line 24, after "movement" insert --direction--.

Signed and Sealed this
Twelfth Day of July, 2016

Michelle K. Lee
*Director of the United States Patent and Trademark Office*